United States Patent [19]

Singer

[11] 3,991,170

[45] Nov. 9, 1976

[54] PROCESS FOR PRODUCING ORIENTATION IN MESOPHASE PITCH BY ROTATIONAL MOTION RELATIVE TO A MAGNETIC FIELD AND CARBONIZATION OF THE ORIENTED MESOPHASE

[75] Inventor: Leonard Sidney Singer, Berea, Ohio

[73] Assignee: Union Carbide Corporation, New York, N.Y.

[22] Filed: June 20, 1975

[21] Appl. No.: 588,845

Related U.S. Application Data

[63] Continuation of Ser. No. 355,043, April 27, 1973, abandoned.

[52] U.S. Cl. .................................. 423/449; 208/22; 208/39; 264/29.3; 423/448
[51] Int. Cl.² ...................... C01B 31/04; C10C 3/00
[58] Field of Search ........... 423/445, 447, 448, 449; 264/24, 29; 208/22, 39, 44, 46, 50, 106, 131; 106/273 R

[56] References Cited
UNITED STATES PATENTS 3,787,541   1/1974   Grindstaff et al. .................... 264/29

OTHER PUBLICATIONS

Sanada et al., "Carbon" vol. 10, No. 5, 1972, pp. 644–645.

Delhaes, "Carbon" vol. 6, No. 6, 1968, pp. 925–935.

Selwood, "Magnetochemistry" 2nd Edition, 1956, pp. 110–134.

*Primary Examiner*—Edward J. Meros
*Attorney, Agent, or Firm*—John S. Piscitello

[57] ABSTRACT

Mesophase pitches wherein the planes of the mesophase portions of the pitch are substantially aligned in a single parallel direction, and the c-axes of said planes are substantially aligned in a single parallel direction, are produced by subjecting a mesophase pitch in its molten state to rotational motion relative to a surrounding magnetic field about an axis perpendicular to the direction of that field.

12 Claims, 8 Drawing Figures

PROCESS FOR PRODUCING ORIENTATION IN MESOPHASE PITCH BY ROTATIONAL MOTION RELATIVE TO A MAGNETIC FIELD AND CARBONIZATION OF THE ORIENTED MESOPHASE

This is a continuation of application Ser. No. 355,043, filed Apr. 27, 1973, now abandoned.

BACKGROUND OF THE INVENTION

1. Field of the Invention

This invention relates to a process for producing orientation in carbonaceous pitches which have been transformed, in part, to a liquid crystal or so-called "mesophase" state. More particularly, this invention relates to a process for orienting the mesophase portions of such pitches by subjecting the pitches in their molten state to rotational motion relative to a surrounding magnetic field about an axis perpendicular to the direction of that field.

2. Description of the Prior Art

Natural and synthetic pitches, as is well known, are complex mixtures of organic compounds which, except for certain rare paraffinic-base pitches derived from certain petroleums, such as Pennsylvania crude, are made up essentially of fused ring aromatic hydrocarbons and are, therefore, said to have an aromatic base. Since the molecules which make up these organic compounds are comparatively small (average molecular weight not more than a few hundred) and interact only weakly with one another, such pitches are isotropic in nature. On heating these pitches under quiescent conditions at a temperature of about 350° C.–450° C., however, either at constant temperature or with gradually increasing temperature, small liquid spheres begin to appear in the pitch which gradually increase in size as heating is continued. When examined by electron diffraction and polarized light techniques, these spheres are shown to consist of layers of oriented molecules aligned in the same direction. As these spheres continue to grow in size as heating is continued, they come in contact with one another and gradually coalesce with each other to produce larger masses of aligned layers. As coalescence continues, domains of aligned molecules much larger than those of the original spheres are formed. These domains come together to form a bulk mesophase wherein the transition from one oriented domain to another sometimes occurs smoothly and continuously through gradually curving lamellae and sometimes through more sharply curving lamellae. The differences in orientation between the domains create a complex array of polarized light extinction contours in the bulk mesophase corresponding to various types of linear discontinuity in molecular alignment. The ultimate size of the oriented domains produced is dependent upon the viscosity, and the rate of increase of the viscosity, of the mesophase from which they are formed, which, in turn are dependent upon the particular pitch and the heating rate. In certain pitches, domains having sizes in excess of two hundred microns up to several hundred microns are produced. In other pitches, the viscosity of the mesophase is such that only limited coalescence and structural rearrangement of layers occur so that the ultimate domain size does not exceed one hundred microns.

The highly oriented, optically anisotropic material produced by treating pitches in this manner has been given the term "mesophase", and pitches containing such material are known as "mesophase pitches". Such pitches, when heated above their softening points, are mixtures of two immiscible liquids, one the optically anisotropic, oriented mesophase portion, and the other the isotropic non-mesophase portion. The term "mesophase" is derived from the Greek "mesos" or "intermediate" and indicates the pseudo-crystalline nature of this highly-oriented, optically anisotropic material.

The highly oriented mesophase spheres which begin to appear in a pitch when it is gradually heated are not only optically anisotropic, but also diamagnetically anisotropic, i.e., they have a large diamagnetic susceptibility in a direction normal to the layers of oriented molecules, and a small susceptibility in a direction parallel to these layers. As a result, when pitch containing such spheres is subjected to a magnetic field, the spheres tend to align themselves with their layer planes parallel to the direction of the magnetic field. However, while this orienting effect causes an alignment of the layer planes of the spheres in a direction parallel to that of the magnetic field, the polar or c-axes of the spheres remain free to rotate in a plane perpendicular to the direction of the magnetic field, so that there is no parallel alignment of the polar axes of the spheres.

SUMMARY OF THE INVENTION

In accordance with the present invention, it has now been discovered that mesophase pitches wherein the layer planes of the mesophase portions of such pitches are substantially aligned in a single parallel direction, and the c-axes of said planes are substantially aligned in a single parallel direction, can be produced by subjecting a mesophase pitch in its molten state to rotational motion relative to a surrounding magnetic field about an axis perpendicular to the direction of that field. The magnetic field subjects the mesophase portions of the pitch to a diamagnetic force which tends to align the layer planes of said mesophase portions in a direction parallel to that of the magnetic field, and when the pitch is simultaneously rotated relative to the field about an axis perpendicular to the field, this diamagnetic force also acts to align the c-axes of said layer planes parallel to the axis of rotation. This unique orientation can be obtained by continuously spinning the pitch in the magnetic field, or rotating the field about the pitch.

DESCRIPTION OF THE DRAWINGS

The unique orientation of the mesophase pitches of the present invention is readily apparent from the attached schematic diagrams and photomicrographs under polarized light.

The photomicrographs were obtained on pitch encapsulated in an epoxy resin in a manner such that transverse or longitudinal sections could be examined. The samples were first fine ground on silicon carbide laps, then polished successively on diamond paste laps and finally with a microcloth saturated with a suspension of 0.3 micron alumina in water. The samples were examined with Bausch and Lomb research metallograph under polarized light using crossed polarizers.

FIG. 3b is identical to 3a except that the microscope stage has been rotated 45° as indicated, which gives rise to random changes in the extinction patterns for the different spheres. The figures show a transverse section of the pitch (perpendicular to the axis of rotation), but longitudinal sections (parallel to the axis of rotation) are substantially the same.

FIG. 4b is identical to 4a except that the microscope stage has been rotated 45° as indicated. Most of the mesophase spheres in FIG. 4a show almost complete extinction while some show cross-like patterns. When the microscope stage is rotated 45°, as in FIG. 4b, the spheres fail to exhibit any change in their extinction patterns, i.e., the spheres which were almost completely extinct remain that way while the cross-like patterns remain completely stationary with stage rotation. In view of this almost total isotropy when the spheres are viewed under polarized light in the direction of the axis of rotation, it must be concluded that the spheres are oriented as depicted in FIG. 2 with their layer planes aligned parallel to the direction of the magnetic field and their polar or c-axes aligned parallel to the axis of rotation.

The spheres which show essentially complete extinction have been sectioned close to their equatorial planes, and when viewed under polarized light resemble flat graphitic layers. On the other hand, the spheres exhibiting cross-like patterns have been sectioned in planes between their poles and their equatorial planes, and the more curved lamellae in these regions of the spheres give rise to patterns of this type. However, because the spheres are completely oriented in the manner described, they maintain their original appearance and do not undergo any changes with microscope stage rotation as in FIG. 4b, indicating that they are truly isotropic when viewed in the direction of the axis of rotation.

Figure 1:
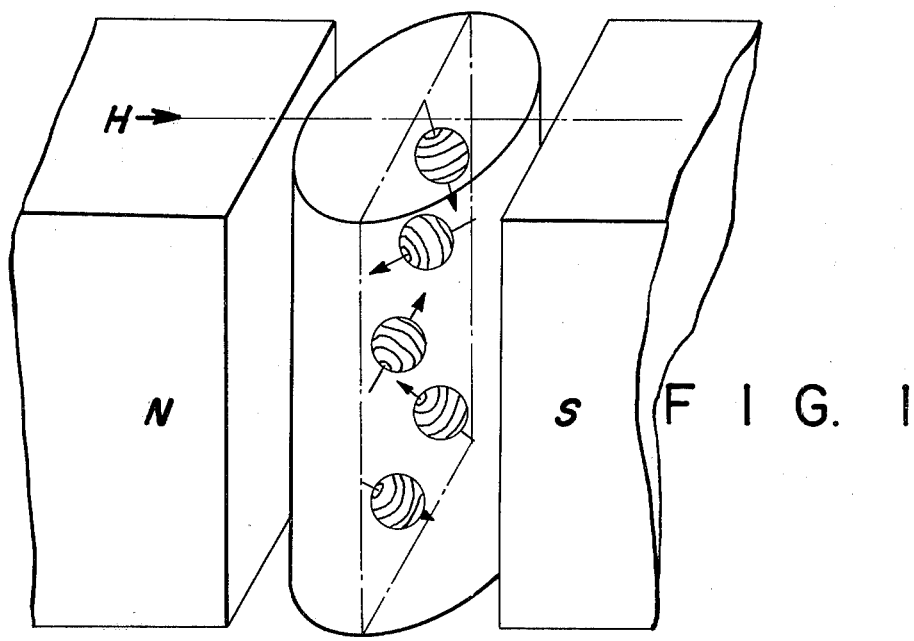
FIG. 1 is a schematic diagram illustrating the orientation of mesophase spheres in a pitch subjected to magnetic field (H). While the layer planes of all the spheres are aligned parallel to the direction of magnetic field (H), the polar or c-axes of the spheres are randomly oriented relative to each other.
Figure 2:
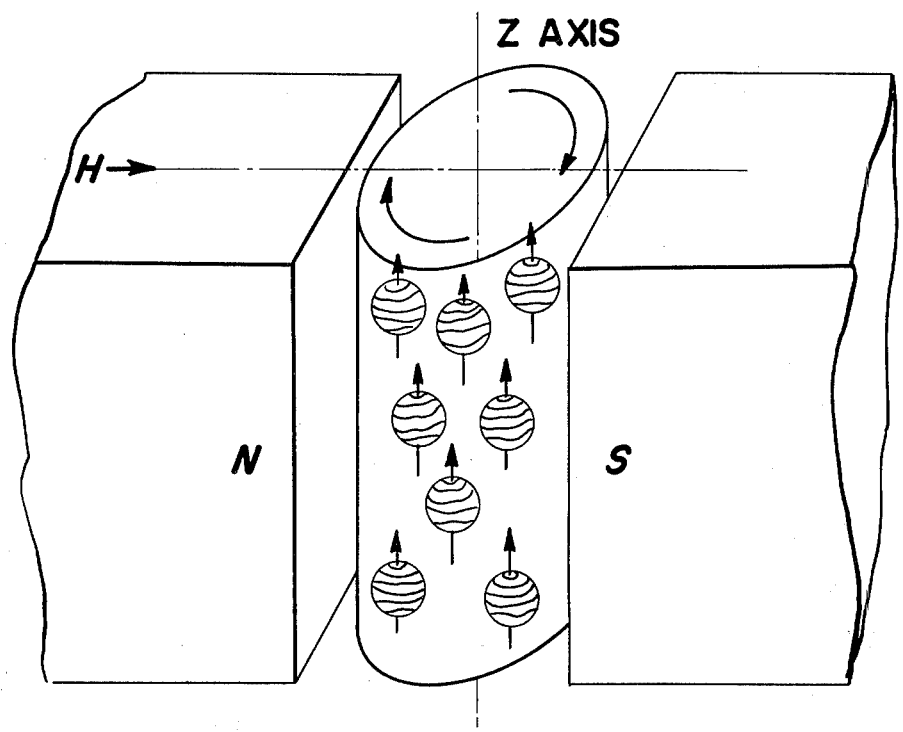
FIG. 2 is a schematic diagram illustrating the orientation of mesophase spheres in a pitch which has been rotated about axis (Z) perpendicular to magnetic field (H). Not only are the layer planes of all the spheres aligned parallel to the direction of magnetic field (H), but, in addition, the polar or c-axes of said planes are all aligned parallel to the axis of rotation of the pitch. The alignment of the polar axes of the spheres in a direction parallel to the axis of rotation is a result of the propensity of the spheres to maintain, without interruption by rotation of the pitch, the orientation in which their layer planes are parallel to the direction of the magnetic field.
Figure 4B:
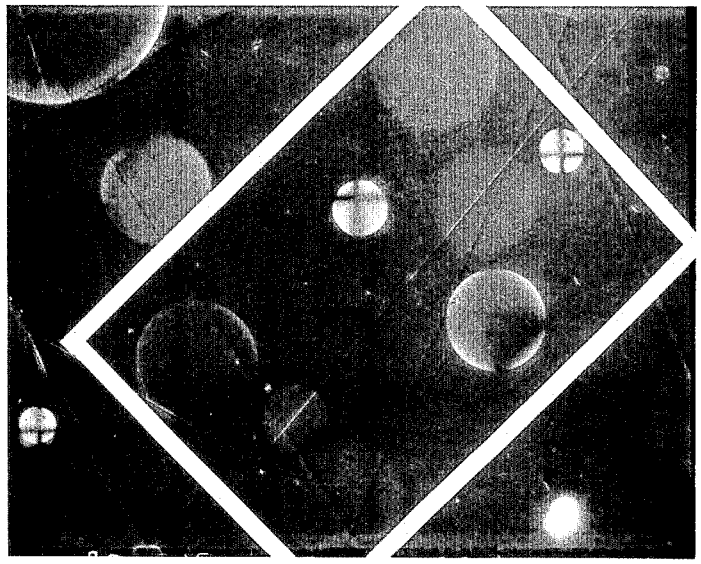
FIGS. 4a and 4b are photomicrographs under polarized light (500 X magnification) of a transverse section of a mesophase pitch prepared in the same manner as the pitch shown in FIGS. 3a and 3b except that the pitch was prepared and cooled while being rotated in a 10 kilogauss magnetic field in a direction perpendicular to the field.
Figure 4A:
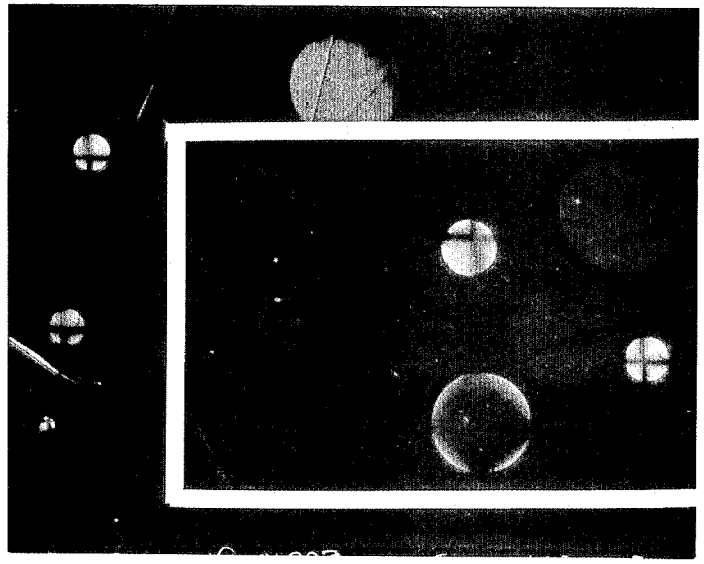
Figure 5B:
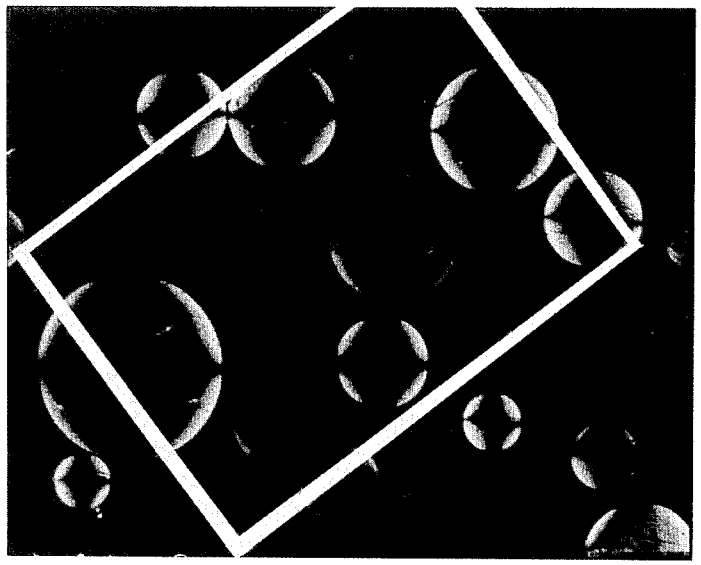
Figure 5B:
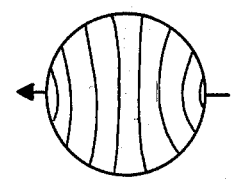
Figure 5A:
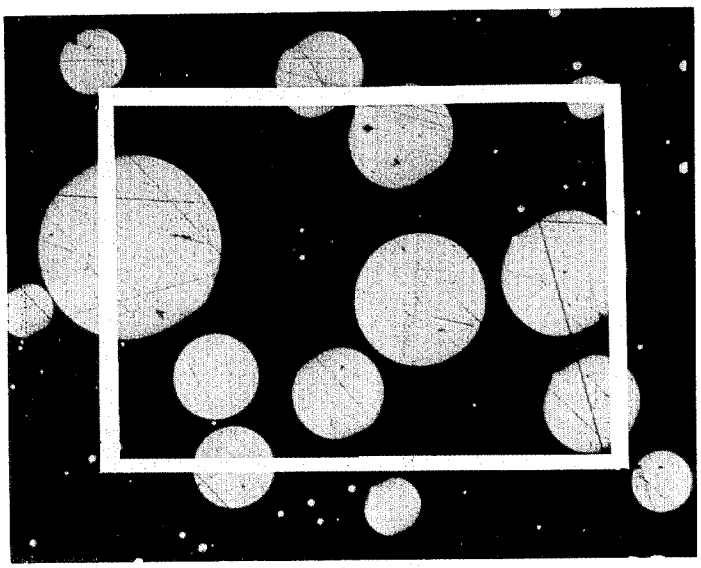
Figure 5A:
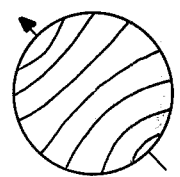

FIGS. 5a and 5b are photomicrographs under polarized light (500 X magnification) of a longitudinal section of a mesophase pitch prepared in the same manner as the pitch shown in FIGS. 4a and 4b. FIG. 5b is identical to 5a except that the microscope stage has been rotated 45° as indicated. The polar axes of the spheres shown in the sketches beside each picture indicate the axis of rotation of the pitch in the magnetic field, as well as the sphere orientation with respect to the direction of the crossed nicols. All the mesophase spheres in FIG. 5a are seen to be totally white when the polar axes of the spheres are positioned at a 45° angle with respect to the crossed nicols, and almost totally extinct after the microscope stage has been rotated 45°, as in FIG. 5b. This uniform anisotropic behavior of the spheres whereby they all exhibit substantially identical anisotropic microscopy patterns when rotated under polarized light indicates that the spheres are oriented as depicted in FIG. 2 with their layer planes aligned parallel to the direction of the magnetic field and their c-axes aligned parallel to the axis of rotation. This structure has been confirmed by sensitive tint microscopy, X-ray diffraction, and electron spin resonance techniques.

The spheres which contain the largest white areas in FIG. 5b have been sectioned close to the median planes containing the polar axes of such spheres. On the other hand, the spheres which show essentially complete extinction have been sectioned furthest from the median plane. Thus, the degree of extinction is determined by how close to the median plane each sphere has been sectioned.

DESCRIPTION OF THE PREFERRED EMBODIMENTS

While it is possible to first prepare a mesophase pitch and then align the meso phase portions of the pitch by subjecting the pitch to rotational motion relative to a surrounding magnetic field, in order to facilitate production of the desired alignment, it is preferable to subject the pitch to such rotational motion during the entire time that the mesophase is being formed.

Alignment of the mesophase portions of the pitch in accordance with the instant invention is effected by rotating the pitch in its molten state about an axis perpendicular to the direction of a surrounding magnetic field, or, alternatively, rotating the magnetic field itself about such axis. The strength of the magnetic field and the rate of rotation of the pitch, or the field, must be such as will subject the pitch to a diamagnetic force which tends to align the layer planes of the mesophase portions of the pitch in a direction parallel to that of the magnetic field, and the c-axes of said layer planes parallel to the axis of rotation. These parameters thus depend to a large extent upon a number of factors including the size of the mesophase spheres or domains, the viscosity of the isotropic phase of the pitch, and the temperature employed. Preferably, the pitch is rotated relative to the magnetic field at a rate of at least 1 rpm. in a field of at least 1 kilogauss in order to effect the desired alignment. Most preferably, the pitch is rotated at a rate of from 2 rpm. to 100 rpm. in a magnetic field of at least 2 kilogauss.

Mesophase pitches can be produced in accordance with known techniques by heating a carbonaceous pitch in an inert atmosphere at a temperature above about 350° C. for a time sufficient to produce the desired quantity of mesophase. By an inert atmosphere is meant an atmosphere which does not react with the pitch under the heating conditions employed, such as nitrogen, argon, xenon, helium, and the like. The heating period required to produce the desired mesophase content varies with the particular pitch and temperature employed, with longer heating periods required at lower temperatures than at higher temperatures. At 350° C., the minimum temperature generally required to produce mesophase, at least one week of heating is usually necessary to produce a mesophase content of about 40 per cent. At temperatures of from about 400° C. to 450° C., conversion to mesophase proceeds more rapidly, and a 50 per cent mesophase content can usually be produced at such temperatures within about 1–40 hours. Such temperatures are preferred for this reason. Temperatures above about 500° C. are undesirable, and heating at this temperature should not be employed for more than about 5 minutes to avoid conversion of the pitch to coke.

Aromatic base carbonaceous pitches having a carbon content of from about 92 per cent by weight to about 96 per cent by weight and a hydrogen content of from about 4 per cent by weight to about 8 per cent by weight are generally suitable for producing mesophase pitches. Elements other than carbon and hydrogen, such as oxygen, sulfur and nitrogen, are undesirable and should not be present in excess of about 4 per cent by weight. The presence of more than such amount of extraneous elements may disrupt the formation of carbon crystallites and prevent the development of a graphitic-like structure when attempts are made to carbonize or graphitize the pitch. In addition, the presence of extraneous elements reduces the carbon content of the pitch and hence the ultimate yield of the carbonized or graphitized product. When such extraneous elements are present in amounts of from about 0.5 per cent by weight to about 4 per cent by weight, the pitches generally have a carbon content of from about 92–95 per cent by weight, the balance being hydrogen.

Petroleum pitch, coal tar pitch and acenaphthylene pitch are preferred starting materials for producing mesophase pitches. Petroleum pitch, of course, is the residuum carbonaceous material obtained from the distillation of crude oils or the catalytic cracking of petroleum distillates. Coal tar pitch is similarly obtained by the distillation of coal. Both of these materials are commercially available natural pitches. Acenaphthylene pitch, on the other hand, is a synthetic pitch which can be produced by the pyrolysis of polymers of acenaphthylene as described by Edstrom et al. in U.S. Pat. No. 3,574,653.

The present invention provides an effective means of producing a unique orientation in mesophase pitches. When a pitch which has been rotated relative to a magnetic field in accordance with the invention is further heated under these conditions to a carbonizing temperature, it is possible to obtain a highly oriented carbonized material. If desired, this carbonized material may be further heated to a graphitizing temperature. If desired, a filler may be added to the pitch and the filled pitch carbonized and graphitized to produce carbon and graphite articles which can be shaped to produce electrodes and like articles.

EXAMPLES

The following examples are set forth for purposes of illustration so that those skilled in the art may better understand the invention. It should be understood that they are exemplary only, and should not be construed as limiting the invention in any manner.

EXAMPLE 1

An acenaphthylene pitch was prepared by heating four hundred and forty-eight grams (448g.) of acenphthylene under nitrogen to 320° C. over a five hour period, and then further heating the resulting polymeric product at this temperature, under reflux, for an additional four hours. After cooling, the product was heated under vacuum to 300° C. to remove acenaphthene and other volatiles. The distilled product was once again cooled, and then reheated in argon to 340° C. at a rate of 60° C. per hour, and maintained at this temperature for one hour. The resulting pitch had a melting point (Vanderkamp) of 160°–173° C.

Figure 3B:
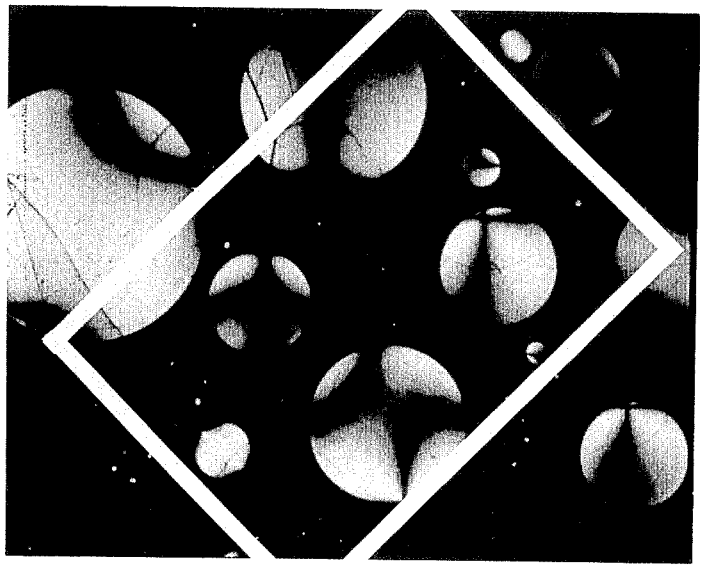
FIGS. 3a and 3b are photomicrographs under polarized light (500 X magnification) of a mesophase pitch which has not been subjected to a magnetic field during its preparation. The pitch was prepared by heating an acenaphthylene pitch at a temperature of 430° C. for one hour under argon while rotating the pitch at a rate of 10 rpm., and then cooling to room temperature while continuing to rotate the sample.
Figure 3A:
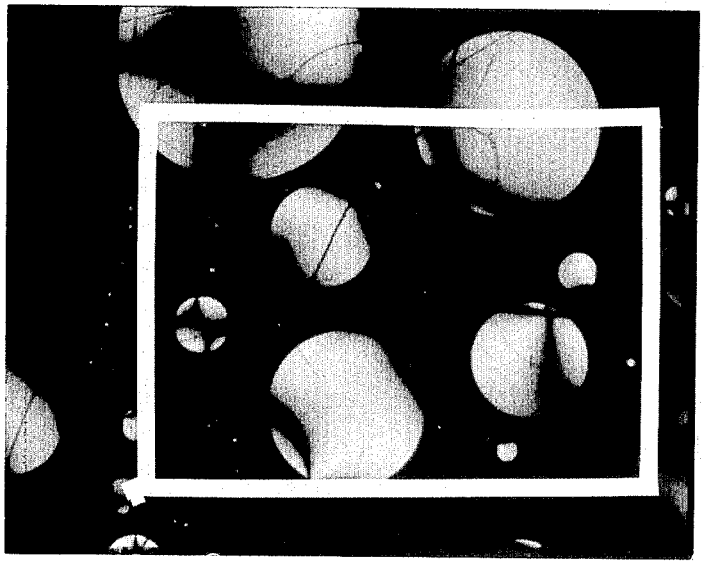

Two Pyrex test tubes having outer diameters of 5 mm. were evacuated, filled to a depth of about one-half inch with a portion of the pitch prepared as described above, and then with about one atmosphere of argon, and finally sealed. The first tube and its contents were then heated at a temperature of 430° C. for one hour while the tube was rotated about an axis parallel to the length of the tube at a rate of 10 rpm. At the end of this time, heating was discontinued and the tube was allowed to cool to room temperature while rotation was continued. The resulting solidified mesophase pitch was then subjected to polarized light microscopy examination. The photomicrographs obtained from this pitch are shown in FIGS. 3a and 3b.

The second test tube was treated in a manner similar to the first test tube except that the second tube was heated while rotated in a 10 kilogauss magnetic field in a direction perpendicular to the field, and then allowed to cool in the field while rotation was continued. The resulting solidified mesophase pitch was then subjected to polarized light microscopy examination. The photomicrographs obtained from this pitch are shown in FIGS. 4a, 4b, 5a and 5b.

What is claimed is:

1. A process which comprises subjecting a mesophase pitch in its molten state to rotational motion relative to a surrounding magnetic field about an axis perpendicular to the direction of said field so as to subject the pitch to a diamagnetic force which acts to align the planes of the mesophase portions of said pitch parallel to the magnetic field direction and the c-axes of said planes parallel to the axis of rotation, said magnetic field being at least 1 kilogauss and the rate of rotation of the pitch being at least 1 rpm.

2. A process as in claim 1 wherein the pitch is further heated to a carbonizing temperature while continuing to subject the pitch to rotational motion relative to a surrounding magnetic field about an axis perpendicular to the direction of said field.

3. A process as in claim 1 wherein the pitch is rotated relative to the magnetic field at a rate of from 2 rpm. to 100 rpm. in a field of at least 2 kilogauss.

4. A process as in claim 3 wherein the pitch is further heated to a carbonizing temperature while continuing to subject the pitch to rotational motion relative to a surrounding magnetic field about an axis perpendicular to the direction of said field.

5. A process as in claim 1 wherein the pitch is subjected to rotational motion relative to a surrounding magnetic field during the entire time that the mesophase is being formed.

6. A process as in claim 5 wherein the pitch is further heated to a carbonizing temperature while continuing to subject the pitch to rotational motion relative to a surrounding magnetic field about an axis perpendicular to the direction of said field.

7. A process as in claim 5 wherein the pitch is rotated relative to the magnetic field at a rate of from 2 rpm. to 100 rpm. in a field of at least 2 kilogauss.

8. A process as in claim 7 wherein the pitch is further heated to a carbonizing temperature while continuing to subject the pitch to rotational motion relative to a surrounding magnetic field about an axis perpendicular to the direction of said field.

9. A mesophase pitch wherein the planes of the mesophase portions of the pitch are substantially parallel and the $c$-axes of said planes are substantially aligned in a single direction perpendicular to the planes.

10. A pitch as in claim 9 derived from petroleum pitch.

11. A pitch as in claim 9 derived from coal tar pitch.

12. A pitch as in claim 9 derived from acenaphthylene pitch.

* * * * *